United States Patent [19]
Wilson et al.

[11] Patent Number: 5,490,602
[45] Date of Patent: Feb. 13, 1996

[54] COMPOSITE STRUCTURE MANUFACTURE

[75] Inventors: Robert S. Wilson, Belfast; Mark A. Braniff, Bangor, both of Northern Ireland

[73] Assignee: Short Brothers PLC, Belfast, Northern Ireland

[21] Appl. No.: 182,188

[22] PCT Filed: Jun. 14, 1993

[86] PCT No.: PCT/GB93/01252

§ 371 Date: Jun. 9, 1994

§ 102(e) Date: Jun. 9, 1994

[87] PCT Pub. No.: WO93/25379

PCT Pub. Date: Dec. 23, 1993

[30] Foreign Application Priority Data

Jun. 15, 1992 [GB] United Kingdom ............ 9212697

[51] Int. Cl.⁶ .................. B31D 3/00; B44C 1/22
[52] U.S. Cl. .............. 216/56; 216/95; 156/148; 156/155; 428/137
[58] Field of Search ................ 156/148, 155, 156/633, 634, 644, 645, 655, 656, 657, 153, 154; 216/33, 56, 83, 95; 428/131, 137, 175

[56] References Cited

U.S. PATENT DOCUMENTS

| | | | |
|---|---|---|---|
| 2,623,241 | 12/1952 | Mackay et al. | 156/155 X |
| 3,966,522 | 6/1976 | Hatch et al. | 156/148 |
| 4,090,002 | 5/1978 | Rosenblum | 428/36 |
| 4,743,496 | 5/1988 | Wrasidlo et al. | 156/155 X |
| 4,885,973 | 2/1989 | Spain | 156/155 X |

FOREIGN PATENT DOCUMENTS

| | | |
|---|---|---|
| 0373379 | 6/1990 | European Pat. Off. |
| 606513 | 7/1945 | United Kingdom. |
| 990554 | 4/1965 | United Kingdom. |
| WO92/11126A | 7/1992 | WIPO. |

*Primary Examiner*—William Powell
*Attorney, Agent, or Firm*—Fish & Richardson

[57] ABSTRACT

A filament reinforced perforate composite sheet is manufactured by forming a filament assembly which includes reinforcing filament structures and passage forming filament structures and in which the passage forming filament structures extend from the front face to the rear face of the assembly, applying a matrix material to the assembly to form a composite sheet in which the passage forming filament structures extend from the front face to the rear face of the sheet and removing the passage forming filament structures or a part or parts thereof to produce a multiplicity of passages extending through the composite sheet. The passage forming filament structures may be continuous monofilaments which may be hollow, an assembly of continuous filaments in the form of a tow or twisted together or a yarn spun from short fibers and the material from which they are made is so selected that they can be melted or dissolved out of the sheet or withdrawn in their original state or parts of the hollow monofilaments removed to form the passages through the sheet.

34 Claims, 5 Drawing Sheets

COMPOSITE STRUCTURE MANUFACTURE

The present invention relates to a method of manufacturing composite structures and is particularly although not exclusively concerned with the manufacture of a filament reinforced perforate composite sheet for use as a facing sheet of a structural component usually referred to as an acoustic liner and used for acoustic attenuation in high level noise aircraft environments such as those in aircraft engine nacelles.

Various facing sheets have been proposed for aircraft acoustic liners. From a noise attenuation view point the so called "linear" liners are currently the most successful. Improved facing sheets for these "linear" liners have been proposed and include for example (i) a stainless steel mesh bonded to an inner perforate aluminium sheet, (ii) a stainless steel mesh bonded to an inner open-weave advanced composite sheet and (iii) a microporous thermoplastic sheet bonded to an open weave advanced composite sheet. Prior to the introduction of the above mentioned linear liner facing sheets, perforate aluminium alloy facing sheets were used.

There is however still a need for a simple perforate facing sheet where for example the increased noise attenuation properties of the linear liners are not required, as in small inherently quiet engines. Also linear liners with the improved facing sheets can be more expensive to produce and/or heavier than those using simple perforate facing sheets.

When a linear with a simple perforate facing sheet is all that is required the ideal choice from a weight saving and fatigue view point is an advanced composite perforate structure eg, carbon/epoxy, carbon/bismaleimide, kevlar/epoxy or the like. Although there is a wide range of manufacturing options for these structures all have disadvantages in one form or another including the following:

(1) Perforating post cure composite sheets, no matter how efficiently done, results in mechanical damage and the capital expenditure required to produce such a large number of holes is very high.

(2) Perforating prior to cure has fiber orientation and hole size limitations; the moulds are very complex and expensive; and release from the moulds over such a large number of holes and from a complex three dimensioned shape presents a problem in production.

(3) Special weaves for the reinforcing filaments have problems with surface roughness; hole geometry (especially maintaining tight open area tolerances) and resin content problems give rise to poor mechanical and acoustical performance.

It is an object of the present invention to provide a method of manufacturing a filament reinforced perforate composite sheet which does not suffer from or does not suffer to the same extent from the above-mentioned disadvantages found in the previously proposed methods of manufacture.

According to a first aspect of the present invention there is provided a method of manufacturing a filament reinforced perforate composite sheet comprising the steps of forming a filament assembly which includes reinforcing filament structures and passage forming filament structures and in which the passage forming filament structures extend from the front face of the assembly to the rear face of the assembly, applying a matrix material to the assembly to form a composite sheet in which the passage forming filament structures extend from the front face of the sheet to the rear face of the sheet and removing the passage forming filament structures or a predetermined part or parts thereof thereby to produce a multiplicity of passages extending through the composite sheet from the front face of the sheet to the rear face of the sheet.

The passage forming filament structures in the above mentioned embodiments of the invention may be continuous monofilaments, an assembly of continuous filaments in the form of a tow or twisted together or a yarn spun from short fibers.

In an embodiment of the invention hereinafter to be described the passage forming filament structures or a predetermined part or parts thereof are made from a selected material so selected as to transform into a dischargeable state when the sheet is subjected to a predetermined condition which does not adversely affect the material or materials from which the matrix and the other filament structures are made and the selected material is removed from the composite sheet by subjecting the composite sheet to the predetermined condition to cause the selected material to transform into the dischargeable state and by discharging the selected material in the dischargeable state from the sheet to produce the multiplicity of passages.

In an embodiment of the invention hereinafter to be described the passage forming filament structures are formed throughout from the selected material, whereby discharge of the dischargeable selected material in the dischargeable state results in complete removal or substantially complete removal of the passage forming filament structures to produce the multiplicity of passages.

In an alternative embodiment of the invention hereinafter to be described the passage forming filament structures are formed from the selected material in a predetermined part or parts only thereof and the disposition of the part or parts are such that the discharge of the selected material in the dischargeable state produces the multiplicity of passages through the composite sheet.

In a specific embodiment of the invention hereinafter to be described the passage forming filament structures are in the form of a yarn which has a core and an outer wall which surrounds the core. The core is made from the selected material and the wall is made from a material which does not transform into a dischargeable state under the predetermined condition, whereby discharge of the selected material in the dischargeable state results in removal of the core of the yarn to produce the multiplicity of passages.

In an embodiment of the invention hereinafter to be described the selected material has a predetermined melt temperature below that of the matrix material and that of the material or materials from which the other filament structures are made and the selected material is removed from the composite sheet by heating the composite sheet to the predetermined melt temperature to cause the selected material to melt and by discharging the selected material in the molten state from the sheet.

In a specific embodiment of the invention the matrix material is a synthetic resins, and the filament assembly and the matrix material are precured at a temperature below the predetermined melt temperature to form the composite sheet. The composite sheet is then subjected to a post curing step in which the composite sheet is heated to a temperature above the predetermined melt temperature to cause the selected material to melt and the selected material in the molten state is discharged from the sheet. The selected material may then discharged in the molten state from the composite sheet by subjecting the sheet to a pneumatic pressure differential which serves to blow or suck out the selected material in the molten state from the sheet.

In an alternative embodiment of the invention hereinafter to be described the selected material is soluble in a solvent with respect to which the matrix material and the material or materials from which the other filament structures are made are insoluble and the selected material is removed from the composite sheet by applying the solvent to the composite sheet to cause the selected material to dissolve in the solvent and discharging the selected material dissolved in the solvent from the sheet.

In an embodiment of the invention hereinafter to be described, the method includes the further step of abrading the front and rear faces of the composite sheet to remove any surface coating of matrix material and to remove or expose the passage forming filament structures extending outwardly from the faces.

In yet another embodiment of the invention the material from which the passage forming filament structures are made is so chosen as to physically degrade to a point at which its original volume approaches zero.

In still yet another embodiment of the invention the material from which the passage forming filament structures are made is so chosen as to be brought to a dischargeable state by subjecting the composite sheet to heating and dissolving combined by example in a heated solvent tower.

In another embodiment of the invention hereinafter to be described, the passage forming filament structures are tubular structures with peripheral walls which forms axial bores through the tubular structure and those parts of the tubular structures which extend outwardly from the front face and from the rear face of the composite sheet are removed to provide a multiplicity of tubular elements which extend within the composite sheet from the front face to the rear face and which have axially extending bores which are open at the front face and the rear face of the sheet to produce the multiplicity of passages. The front and rear faces of the composite sheet may be abraded to remove those parts of the tubular structures lying outside the front and rear faces of the composite sheet.

In yet another embodiment of the invention hereinafter to be described the passage forming filament structures are made from a selected material so selected as to have a predetermined tensile strength and the passage forming filament structures are removed from the composite sheet by mechanically withdrawing them to produce the multiplicity of passages.

In a first embodiment of the invention hereinafter to be described the filament assembly is formed by weaving two or more reinforcing sub-assemblies of yarn to form a single ply fabric sheet and the passage forming filament structures are yarns in one or each of the yarn sub-assemblies.

Alternatively, the filament assembly is formed by braiding two or more reinforcing sub-assemblies of yarn to form a single ply fabric sheet and the passage forming filament structures are yarns in one or each of the yarn sub-assemblies.

In yet another embodiment of the invention hereinafter to be described the filament assembly includes a reinforcing assembly of reinforcing filament structures and an auxiliary assembly of auxiliary filament structures which extend from a first face of the reinforcing assembly to an opposite second face of the reinforcing assembly by passage through the reinforcing assembly and the passage forming filament structures are passage forming auxiliary filament structures in the auxiliary assembly.

In a specific embodiment of the invention, hereinafter to be described the passage forming auxiliary filament structures of the auxiliary assembly are loop forming yarns which pass along the first face of the reinforcing assembly and are formed at intervals therealong with loops which penetrate the reinforcing assembly and which extend from the first face of the reinforcing assembly to the opposite second face of the reinforcing assembly.

Each loop of each loop forming yarn may be produced in a "tuft" stitching process in which a stitching needle penetrates the reinforcing assembly and upon withdrawal leaves the filament loop in a passage in the reinforcing assembly produced by the needle. The auxiliary assembly may be obtained by "modified lock" stitching and include for each loop forming yarn a loop retention yarn which runs along the second face of the reinforcing assembly and passes through and retains the ends of the loops of the loop forming yarn.

The loop forming yarns may be removed by melting out, dissolving out or by a combination of melting and dissolving out. Alternatively the loop forming yarns may be physically removed using a mechanical withdrawal method where the yarns are pretreated/coated with release agent to facilitate release and the loop forming yarns and the loop retention yarns are removed from the composite sheet in the formation of the perforate composite sheet. Alternatively, a release film may be applied to the first face of the reinforcing assembly prior to the application of the loop forming yarns to assist in the subsequent removal of the loop forming yarns.

In an embodiment of the invention, the loop forming yarns are applied to the reinforcing assembly by chain stitching.

In yet another embodiment of the invention hereinafter to be described the filament assembly is formed by interlacing three or more reinforcing assemblies of yarns to form a multi-ply fabric reinforcing sheet and the passage forming filament structures are yarns of one or more of the reinforcing yarn assemblies which traverse the fabric sheet from a first face thereof to an opposite second face thereof.

The multi-ply fabric sheet may be produced by three dimensional angle interlock weaving of the yarns of the reinforcing yarn assembly, by orthogonal weaving of the yarns, by three dimensional knitting of the yarns or by three dimensional braiding.

Alternatively, the multi-ply fabric sheet is produced by multiaxial warp knitting to produce a fabric sheet formed from superposed warp, weft and bias yarn sub-assemblies held together by an assembly of stitching yarns and the passage forming filament structures are stitching yarns in the stitching yarn assembly. The stitching yarns may for example be applied to the reinforcing sub-assemblies in the form of a chain or tricot stitch. All or only some of the stitching yarns may be chosen as passage forming yarns.

Preferably, the matrix material is a synthetic resin and the reinforcing filament structures of the reinforcing systems are carbon or graphite continuous filament fibres assembled to form a continuous filament yarn or tow.

According to a second aspect of the present invention there is provided a filament reinforced perforate composite sheet manufactured by a method according to the first aspect of the invention.

Some embodiments of the invention will now be described by way of example with reference to the accompanying drawings in which:

The manufacture of a filament reinforced perforate composite sheet in accordance with the invention requires the formation of a composite sheet in which a filament assembly is embodied in a matrix material and in which the filament assembly includes passage forming filament structures which extend from the front face of the composite sheet to the rear face of the sheet and which can be removed from the sheet to produce the perforate composite sheet.

The filament assembly may take any one of a number of different forms, with the passage forming filament structures forming filament structures of the assembly either as part of a reinforcing filament assembly or as filament structures of an auxiliary assembly of filament structures employed to stitch together a multi-ply assembly of reinforcing filament structures.

Figure 1:
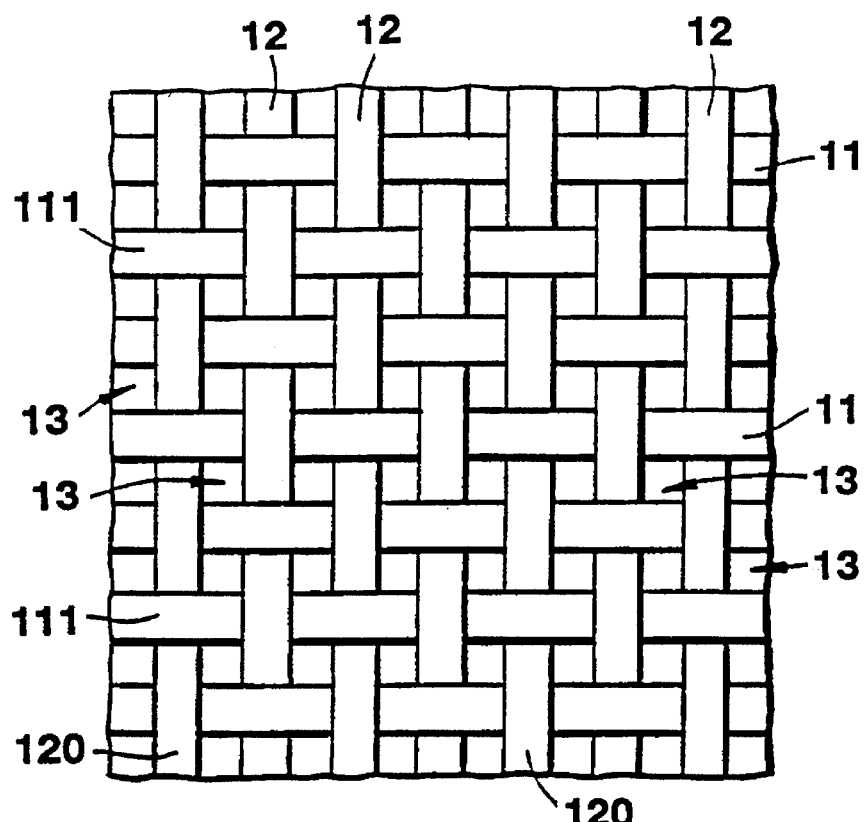
FIG. 1 is a schematic plan view of a single ply woven fabric reinforced composite sheet for perforation by the method according to the invention.
Figure 2:
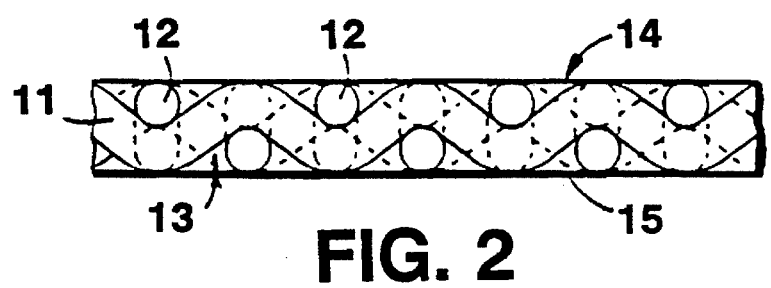
FIG. 2 is a schematic cross-section of the composite sheet shown in FIG. 1.

Referring first to FIGS. 1 and 2 of the drawings the filament assembly in its simplest form may comprise a single ply biaxial weave woven fabric and a composite sheet formed by embodying the fabric in a matrix material as illustrated in FIGS. 1 and 2 of the drawings. As will be seen warp yarns 11 of the plain weave fabric are interwoven with weft yarns 12 and the woven fabric embodied in a matrix material 13 to form the composite sheet 10. The passage forming yarns are then predetermined yarns 111 in the warp yarn system or a combination of warp yarns 111 and weft yarns 120. Alternatively, the passage forming yarns may be predetermined yarns 120 in the weft yarn system. As will be seen from FIG. 2, each warp yarn 11 and correspondingly each weft yarn 12 extends from a front face 14 of the composite sheet to a rear face 15. The passage forming yarns 111 or 120 embodied within the warp or weft yarn systems or in both likewise extend from the front face 14 to the rear face 15 of the composite sheet 10.

Figure 3:
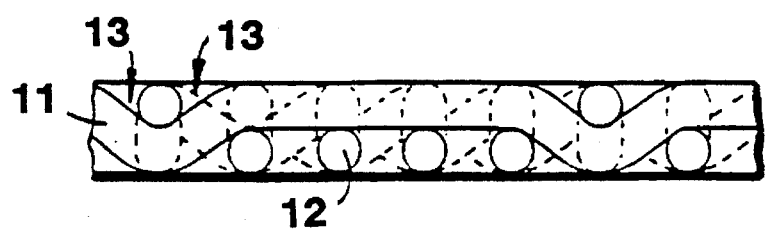
FIG. 3 is a schematic cross-section of a composite sheet embodying a single ply 5-end satin fabric weave which can be used in place of the fabric in the composite sheet shown in FIGS. 1 and 2.

In an alternative form, the composite sheet 10 includes a single ply woven fabric other than a plain weave fabric. Furthermore, as illustrated in FIG. 3, a 5-end stain weave fabric is provided. The passage forming yarns are as before included as warp or west yarns in the fabric. As will be seen, the warp and weft yarns extend across the composite sheet from the front face 14 to the rear face 15 at intervals spaced apart by five yarn ends. The provision of passage forming yarns would then provide apertures through the composite sheet following removal of the passage forming yarns at a spacing greater than that for the plain weave configuration illustrated in FIGS. 1 and 2.

It will however be appreciated that the single ply fabrics described with reference to FIGS. 1 to 3 although suitable for some purposes may be found to provide insufficient reinforcement in a composite sheet for other purposes. To increase the reinforcing properties of the composite sheet a multi-ply reinforcing yarn assembly may be provided which comprises three or more reinforcing yarn sub-assemblies which are superposed or interlaced to form the multi-ply assembly.

The reinforcing yarns of one sub-assembly may however not extend into the other sub-assemblies and an auxiliary yarn assembly needs to be provided which includes yarns which extend from the front face of the multi-ply assembly to the rear face so that the required passage forming yarns can be provided by the auxiliary yarns or by a selection from them. Such auxiliary yarns may conveniently be provided as stitching yarns in a conventional stitching process using a standard sewing machine or by warp knitting.

Figure 4:
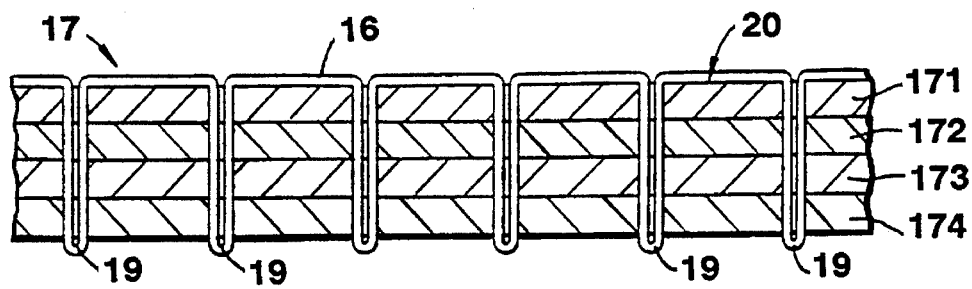
FIG. 4 is a schematic cross-section of a filament assembly for a fabric reinforced composite sheet for use in carrying out the method according to the invention and including a reinforcing multi-ply assembly of reinforcing yarns and an auxiliary assembly of passage forming auxiliary yarns obtained by "tuft" stitching the auxiliary yarns through the reinforcing multi-ply assembly.

In its simplest form, as illustrated in FIG. 4, a reinforcing yarn assembly 17 comprises four yarn sub-assemblies 171 to 174 superposed on each other. Prior to addition of a matrix material to the assembly 17 stitching of auxiliary yarns is carried out in a stitching process in which loop forming stitching yarns 16 are "tuft" stitched through all four sub-assemblies 171 to 174. As will be seen, each stitching yarn 16 passes along the upper face 20 of the uppermost sub-assembly 171 and is formed at intervals therealong with loops 19 which penetrate the sub-assemblies 171 to 174 and extend to the rear face 21 of the sub-assembly 174. Each loop 19 of each loop forming yarn 16 is produced in a stitching process in which a stitching needle carrying the yarn 16 penetrates the assembly 17 and upon withdrawal leaves the yarn loops 19 in a passage in the assembly 17 produced by the needle.

The assembly 17 together with the auxiliary yarns 16 are embodied in a matrix material which is then cured to form a fabric reinforced composite sheet. The yarns 16 are then removed as hereinafter to be described to form the perforated composite sheet.

Figure 5:
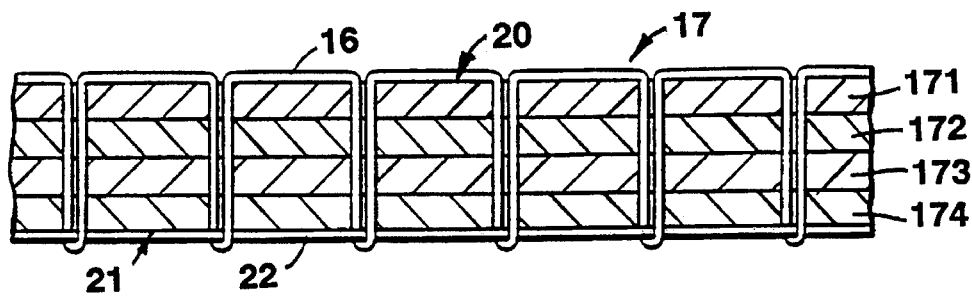
FIG. 5 is a schematic cross-section of a filament assembly for use in the method according to the invention and including a reinforcing multi-ply assembly of reinforcing yarns and an auxiliary assembly of passage forming yarns which pass through the reinforcing assembly and which are produced by a "modified lock" stitching process which utilises a locking yarn.
Figure 6:
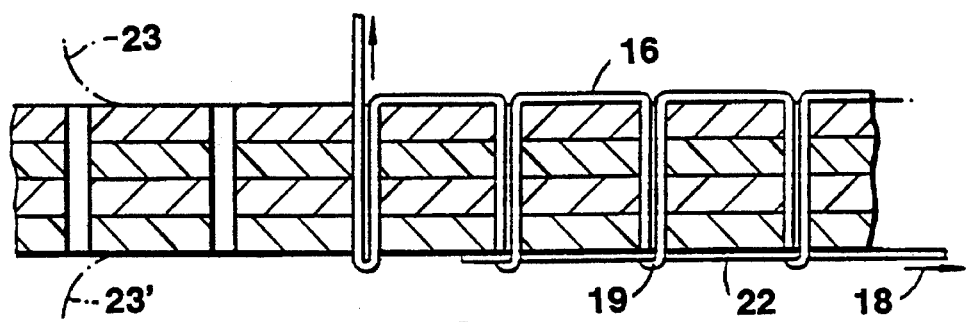
FIG. 6 is a schematic cross-section of a filament assembly which has a reinforcing multi-ply yarn assembly and an auxiliary yarn assembly as shown in FIG. 5 and which is modified to improve the conditions for removal of the passage forming yarns and locking yarns.
Figure 7:
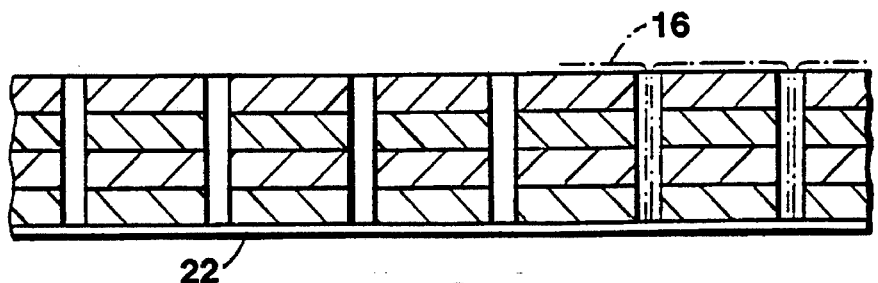
FIG. 7 is a schematic cross-section of a filament assembly as illustrated in FIG. 5, showing to the right of the figure a partial melt out of the passage forming yarns and retention of an inert locking yarn and to the left of the figure the assembly with the passage forming yarns completely discharged from the filament assembly and with inert locking yarn remaining in place.
Figure 8:
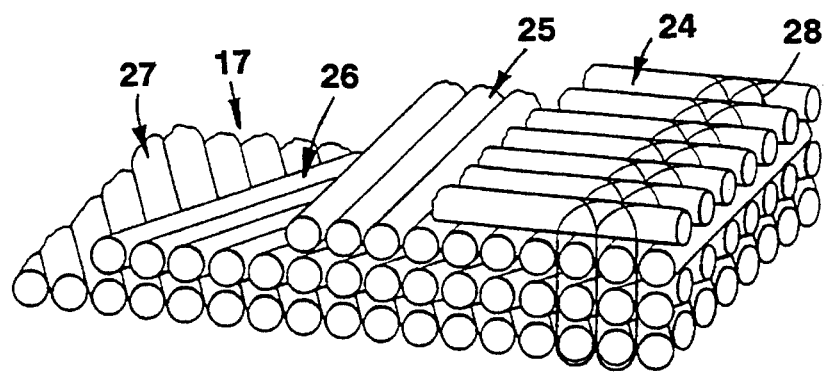
FIG. 8 is a schematic perspective view of a multi-ply multi-axial filament assembly for use in a perforated composite sheet to be produced by the method according to the invention and obtained by multi-axial warp knitting superposed warp, weft and bias yarns which are held together by stitching yarns.

In FIG. 5, there is illustrated a reinforcing yarn assembly 17 which comprises four sub-assemblies 171 to 174 and an auxiliary stitching yarn assembly in which loop forming yarns 16 are formed prior to the addition of matrix material as described with reference to FIG. 4. A "modified lock" stitching process is however employed in which the yarn loops 19 are retained at the rear face 21 of the assembly 17 by a locking yarn 22. In such an arrangement the locking yarn 22 may be removed prior to withdrawal of the loop forming yarns 16 as schematically illustrated in FIG. 6 by the arrow 18. To assist physical removal of the yarns 16 and 22, the faces 20 and 21 of the assembly 17 may prior to the stitching process be coated with release films 23 and $23^1$ and the yarns 16 and 22 may also or alternatively be coated with a release material.

Where the loop forming yarns 16 are composed of a material which enables them to be melted out or dissolved from the composite sheet, the locking yarns 22 may be made from a material which does not melt out or dissolve so that they remain in place on the rear face 21 of the composite sheet as illustrated in FIG. 7.

Where the yarn subassemblies forming the multi-ply assembly 17 are superposed warp, weft and bias yarn sub-assemblies as illustrated in FIG. 8, they may be held together by stitching yarns produced in a warp knitting process. As illustrated in FIG. 6, warp weft yarn sub-assemblies 24 and 25 ±45° bias yarn sub-assemblies 26 and 27 form a multi-ply assembly of superposed plies which are held together by warp knitted stitching yarns 28. The passage forming yarns are then predetermined ones of the stitching yarns 28 which are melted out or dissolved out of the composite sheet formed from the assembly 17 shown in FIG. 8 embodied in a matrix material.

Figure 9:
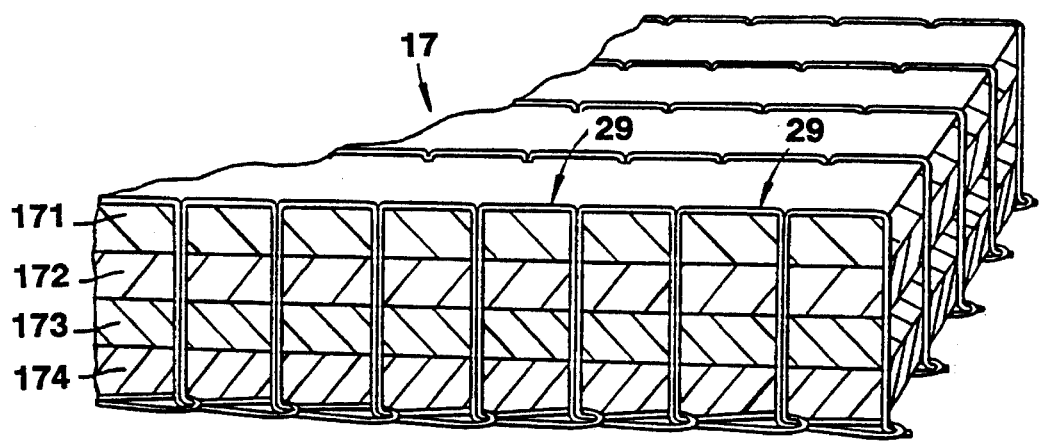
FIGS. 9 and 10 are schematic perspective views illustrating chain and tricot stitching for stitching together multi-axial reinforcing yarn sub-assemblies to form a filament assembly in which the passage forming yarns of the filament assembly are predetermined ones of the stitching yarns.
Figure 10:
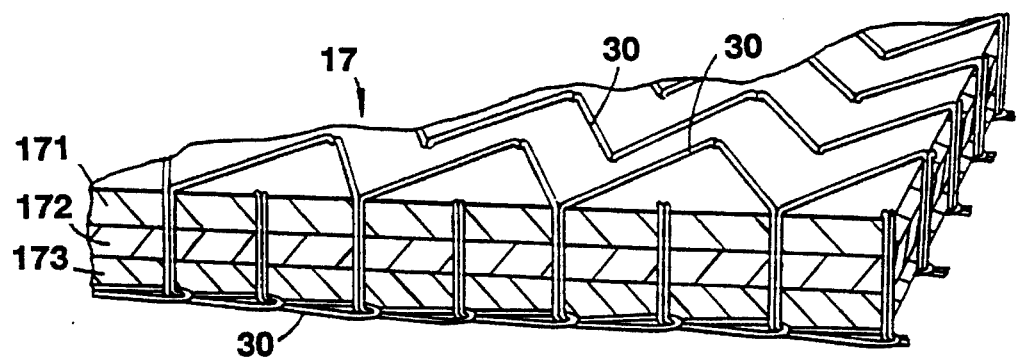
Figure 11:
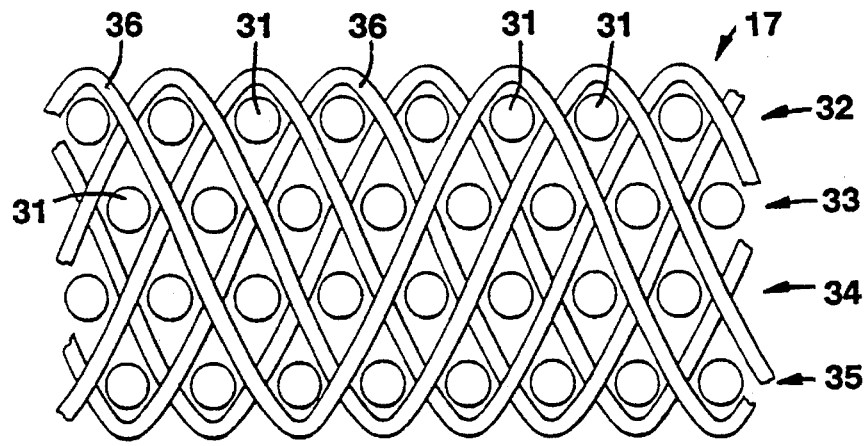
FIG. 11 is a schematic section of an angle interlock woven yarn assembly in which passage forming filament structures are formed by warp yarns which traverse the assembly from one face of the assembly to the other.

FIGS. 9 of the drawings illustrates an assembly 17 comprising yarn sub-assemblies 171 to 174 bound together by stitching yarns which stitch together the superposed yarn sub-assemblies by a chain stitching 29 as illustrated in FIG. 9. Similarly, the sub-assemblies 171 to 173 of the assembly 17 illustrated in FIG. 10 are stitched together by tricot stitching of the stitching yarns 30. In each arrangement predetermined ones of the stitching yarns 29 and 30 are selected as passage forming yarns which can be removed from composite sheets reinforced by the assemblies 17 to produce the perforate composite sheet by the method according to the invention.

Where a multi-ply filament assembly is required for reinforcement for the composite sheet, the multi-ply assembly may comprise three or more reinforcing yarn sub-assemblies in which warp and weft yarns of the different yarn sub-assemblies are interlaced in various ways. Such interlacing is present in angle interlock weaving which interlaces warp yarns with filling yarns of adjacent systems. In particular, a warp interlock woven assembly may include warp yarns which are interlaced between the face and back plies of the assembly as illustrated in FIG. 11 in which ends of weft yarns 31 of plies 32, 33, 34 and 35 are interlaced with warp yarns 36 which extend through the assembly 17 from the facing ply 32 to the rear ply 35 and which then include passage forming yarns for subsequent removal by the method according to the invention to produce a perforate composite sheet.

Angle interlock weaving is only one example of three dimensional weaving. In fact, there are many weave patterns which include yarns which pass through the thickness of the fabric from one face to the other and which may be used to provide the yarn assembly for reinforcement of the composite sheet, while at the same time including the passage forming yarns for subsequent removal by the method according to the invention.

Figure 12:
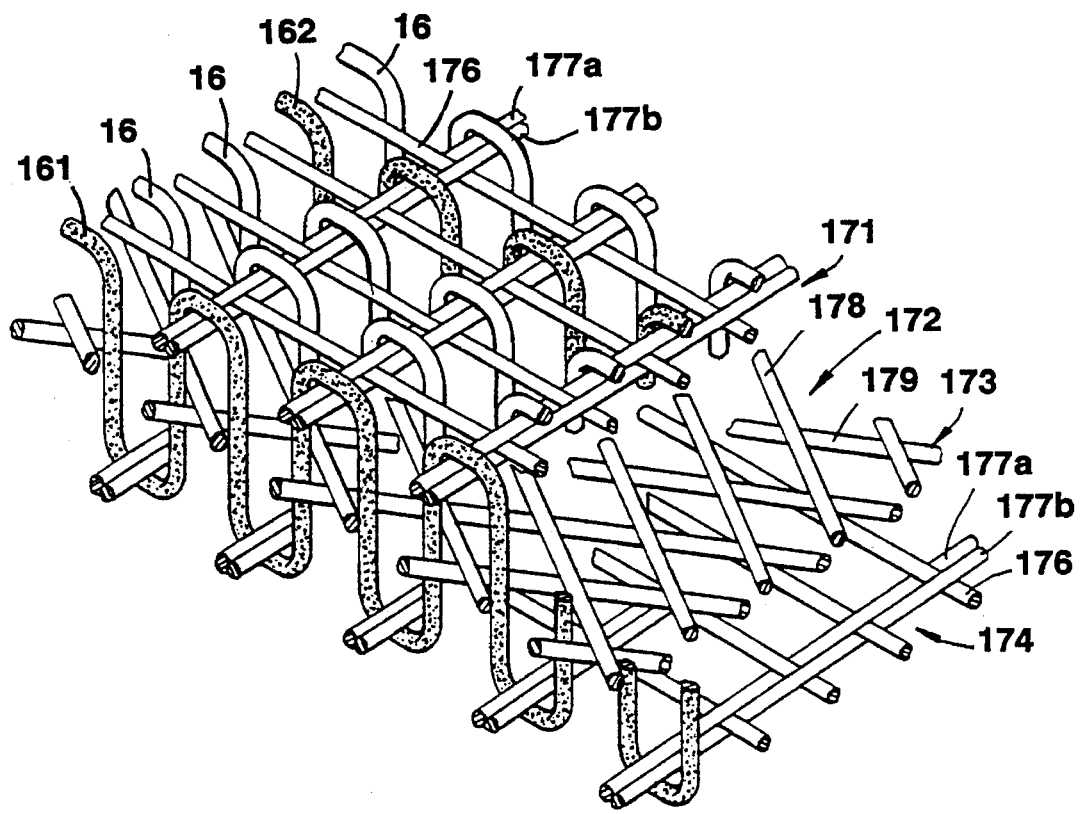
FIG. 12 is a schematic perspective view of a three-dimensional woven yarn assembly for use in the method according to the invention, which includes superposed reinforcing yarn sub-assemblies bound together by a sub-assembly of reinforcing binding warp yarns which include passage forming yarns for use in the method.

In an alternative three dimensional reinforcing yarn assembly illustrated in FIG. 12, four reinforcing yarn sub-assemblies 171 to 174 are provided and are bound together by binding warp yarns 16. The sub-assemblies 171 and 174 are woven yarn sub-assemblies, each of which comprises warp yarns 176 and holding weft yarns 177a and 177b which are woven in plain weave pattern with the warp yarns 176. The sub-assemblies 172 and 173 are non woven superposed sub-assemblies of ±45° bias warp yarns 178 and 179 arranged between the woven sub-assemblies 171 and 174. The binding warp yarns 16 are woven into the sub-assemblies as illustrated and are held at the upper and lower faces of the assembly by the woven sub-assemblies 171 and 174. The binding warp yarns 16 serve to hold the superposed sub-assemblies 172 and 173 in place and additionally provide reinforcement for the assembly in the thickness direction of the assembly. Selected binding warp yarns 161 and 162 are formed as passage forming yarns and are removed by the method according to the invention to produce the perforate composite sheet embodying the reinforcing assembly shown in FIG. 12.

Three methods of producing filament reinforced perforate composite sheets according to the invention will now be described. All three methods lead to the production of perforate composite sheets all of which have the following advantages:

(1) The sheets produced have better acoustical properties than simple non-composite perforate sheets, but probably not as good as linear acoustic liners.

(2) The sheets can be manufactured at a subsequently lower cost.

(3) The reinforcing yarn systems of the sheet suffer minimal mechanical damage compared to that from mechanical forming methods such as drilling and from laser and water jet techniques.

(4) The sheets can be manufactured with complete freedom of the reinforcing filament structures thereby capitalizing on the known advantages of using composite structures.

All three methods utilize passage forming filament structures which pass through a reinforcing yarn assembly which is embodied in a matrix material and which forms the final lay-up. Where passage forming stitching yarns are employed, the stitching can be done when the reinforcing assembly is flat or in its final component shape. Stitching may be carried out using a standard sewing machine or by a warp knitting machine, for example, such as supplied by Liba and Mayer. The stitch location/pattern will typically be done using computer numerical control and will form the final "hole" pattern. After stitching, the dry fabric assembly is placed on a mould form, resin impregnated and cured. The stitching yarns are then removed to form the perforated composite sheet.

Removal of the passage forming stitching yarns can be carried out using any of following methods:

Method 1'—Melt Out

In the "melt out" technique, the material chosen for the stitching yarns has a low melt temperature. The composite sheet which includes the reinforcing multi-ply yarn assembly and the stitching yarns embodied in a matrix material is initially cured at a "low" temperature (during which the stitching yarns remain largely unaffected) and then post cured at a substantially higher temperature, during which the stitching yarns melt and are removed from the composite sheet either by gravity or by the local application of a pneumatic pressure differential (blow out or suction) to form the perforations in the composite sheet.

Immediately prior to post cure both the composite sheet surfaces are lightly abraded, eg shot blast to remove the fine coating of matrix resin on the surface and to expose the stitching yarns. The abrasion will also prepare the surfaces for painting and subsequent bonding operations.

Where a low temperatures polymer is used for the stitching yarns the fabric assembly can be preformed for resin injection, that is to say, the fabric plies of the multi-ply assembly are placed in a heated press and formed to the final mould shape. During this time the polymer of the stitching yarns softens and allows the fabric to assume the final form. On cool down, the polymer re-hardens to fix the shape. (The use of such polymers is already well established for this function; however, they are generally either woven into fabrics or laid between fabrics in the form of netting).

Materials for the low melt thermoplastic stitching yarns include: polypropylene, polyvynlchloride, polyamide, thermoplastic polyester, polyurethane and polyethylene. Typical matrix resins would be BMI, epoxy, polyimide and the like.

Non polymer "melt-out" materials such as metals, for example, lead alloys may be used.

Method 2—Wash Out

In the "wash-out" technique, the stitching yarn material is chosen because of its low resistance (i.e., it will dissolve, soften or weaken) in any particular liquid which has little or no adverse effect on the matrix material and the material of the reinforcing yarns. It may for example be soluble in water, chlorinated solvents, esters and ketones and the like. After cure of the matrix material and surface abrasion the composite sheet is submerged in a bath and the stitching yarns dissolve, soften or weaken such that they can be removed by washing out, by suction or by blowing out to form the perforations in the sheet. In certain circumstances it may be possible to combine both techniques, for example by submersion in heated degreasing towers.

Materials for the solvent soluble yarns include: chlorinated polyvynlchloride, polyvynchloride, polyamide, thermoplastic polyester, cellulose triacetate and Solvron (water soluble) (Registered trade mark). Typical matrix resins would be BMI, epoxy, polyimide and the like.

In both the "melt-out" and "wash-out" techniques, grooves are created (by the removed stitching yarns) along the face of the composite sheet, which is generally not preferred for air wet surfaces, that is to say, surfaces subject to air flow across them. This can be overcome by choosing a modified lock stitch process illustrated in FIG. 5 in which the locking yarns 22 run along an air wet face such as face 21. The locking yarn 22 specifically chosen for this face is not affected by the filament removal technique so that after removal of other stitching yarns, the yarns 22 running along the face 21 remain in place preventing the formation of the groove (see FIG. 7).

Method 3—Mechanical Removal

In this technique, the material for the stitching yarn is chosen because of its high tenacity. The yarn is coated with a release agent such as Frekote 44 or PTFE to ensure there is no bond to the matrix material. Prior to stitching, outer surfaces of the reinforcing assembly of yarns are also coated with a release film, for example PTFE. The stitching yarns pierce both film layers and the reinforcing assembly such that the majority of the stitching yarns are in direct contact with the film and not the reinforcing sub-assembly plies. This method requires the "modified lock" stitch process previously described, that is to say, with one locking yarn along the face 21 (see FIG. 6). After the addition of the matrix and its cure, the locking yarn 22 is mechanically withdrawn along the axis of the filament. This frees the other stitching yarn 16 which is withdrawn by pulling normal to the composite sheet. The release film can then be removed. The mechanical removal technique avoids the requirement for post cure surface abrasion and is particularly suited to prepreg stitching; however, fine surface grooving cannot be avoided. Suitable materials for the yarns using the above technique are Kevlar or high tenacity carbon fibre. Prepregs are formed from reinforcing fabric preimpregnated with an uncured resin ("B" staged) prepared in a separate operation, usually using either a hot melt resin or solution coating (resin bath impregnation) treatment.

Any stitching pattern can be used in method 1, 2 or 3 hereinbefore described, such as "tufted", "modified lock", chain and tricot; however, as described, the modified lock stitch is preferred.

As to resin matrix impregnation, methods 1 and 2 are ideally suited to resin transfer moulding (RTM). Resins can also be impregnated by placing (hot melt) film on to the surface of the reinforcing fabric assembly or by using standard prepregging techniques (not solution coating for method 2 and the derivative combining methods 1 and 2). The hot melt temperature must be much lower than the melt out temperature for method 1 and the derivative combining methods 1 and 2. The impregnated assembly is then bagged for autoclave cure. Prior to cure, heat and vacuum is applied and the resin melts and is absorbed into the fabric assembly in a manner similar to the resin film infusion technique (RFI). Both techniques are well known.

The "mechanical removal" method is ideally suited for prepreg stitching, using the release film (i) to assist with handling, (ii) to prevent resin transfer and avoid risk of contamination and (iii) to facilitate stitching yarn release.

The impregnation techniques available are summarized as follows:

Method 1

(i) RTM (ii) Solution coating prepreg (iii) Hot melt prepreg or Resin Film

Infusion (RFI) with low melt temperature after stitching, weaving, braiding or knitting to form the fabric assembly

Method 2

(i) RTM (ii) Hot melt prepreg or RFI after stitching, weaving, braiding or knitting to form the fabric assembly.

For the derivative combining methods 1 and 2 only RTM is recommended

Method 3

(i) Prepreg stitched after prepregging
(ii) RTM
(iii) RFI at low temperature

Advantages over other perforating techniques are:

(a) Lower costs which can be achieved:
  (i) by the use of RTM techniques (no autoclaves/prepreg cost and refrigeration storage).
  (ii) by the use of state-of-the-art techniques such as weaving, stitching, knitting and braiding
  (iii) by avoiding very high capital expenditure items.

(b) Structural advantages are:
  (i) mechanical damage is minimal. Needles deflect yarns rather than breaking them, especially in dry fabric,
  (ii) curing resin matrix after stitching self heals and self seals the broken yarns,
  (iii) no post-cure mechanical damage or heat affected zone, and
  (iv) no mechanical damage at all if three dimensional weaving is chosen.

(c) Improved acoustic attenuation is obtained, that is to say, performance is improved over simple perforates because of the numerous small holes and the complex paths through the composite sheet.

(d) Good aerodynamic properties are achieved by making smooth air wet surface possible.

(e) Simple mould design can be employed and complex mould removal problems avoided.

(f) All the inherent advantages of fiber reinforced composites are obtained, for example weight saving, easily mouldable, and no ply-orientation restrictions except for "3D" multi-layer fabrics. Altering the open area is simple. There is wide range of structural RTM resins available and these are continually being developed and becoming available on the market—epoxy, bismaleimide, polyimide. Total freedom in fabric styles is provided, including the use of standard 3D woven styles.

(g) A manufacturing process is provided which is faster than most of the other options available.

Consideration needs to be given during production to the following:

(1). Choosing optimum method for filament removal.
(2). Choosing best filaments (for hole generation), that is to say:
  (i) consideration of filament chemistry, and
  (ii) providing fabrics capable of being stitched, woven, knitted or braided at close dimensional tolerances
(3). Optimising filament removal technique with minimum damage to composite sheet.
(4). Optimising stitching insertion parameters to avoid friction problems, breakage problems and the like.
(5). Testing for acoustic, mechanical and chemical properties.
(6). Choosing optimum abrading techniques and its automation, for example shot blasting.
(7). Choosing optimum bonding and painting techniques for product.
(8). Choosing optimum composite materials, such as reinforcing yarns and matrix resins.
(9). Choosing optimum moulding technique
(10). Testing effect of inter-laminar slippage and effect of drape.
(11). Choosing appropriate preforming, lay-up and trimming technique (including optimising stitch pattern vs drape).
(12). Evaluating different yarn samples and fabric styles.

Figure 13:
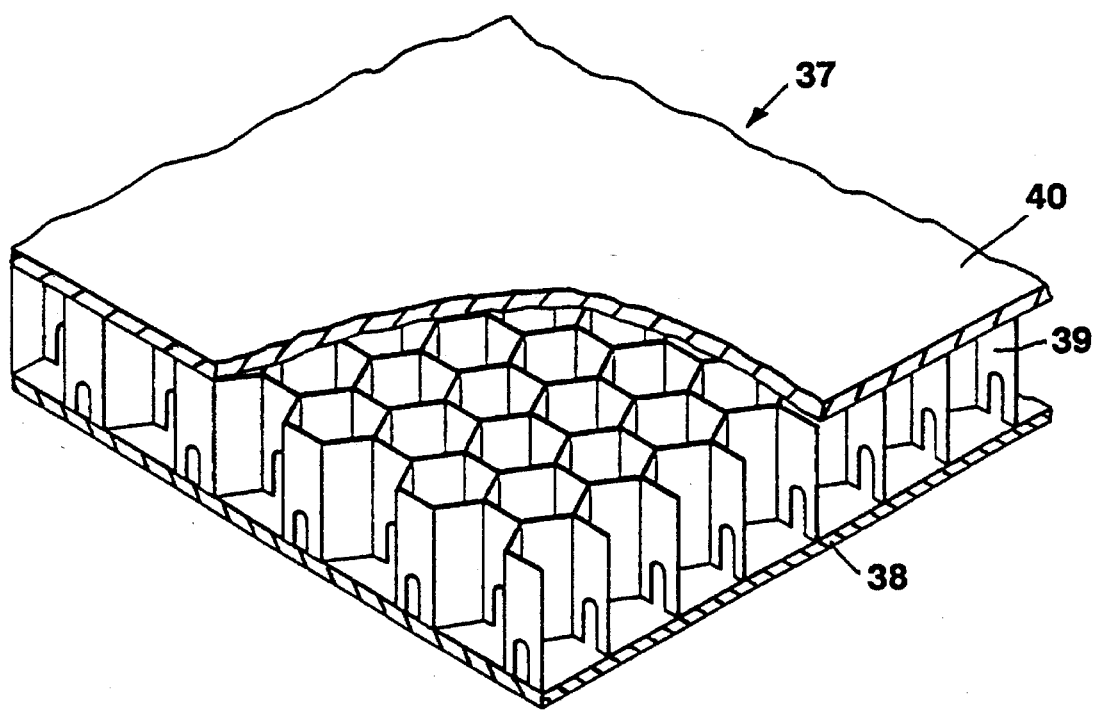
FIG. 13 is a schematic perspective view of a noise attenuation panel having a filament reinforced perforate composite facing sheet produced by the method according to the invention.

The perforate composite sheet produced by the method according to the invention may be used as a perforate facing sheet (and/or a septum layer) of a "standard" acoustic attenuation panel as illustrated in FIG. 13, in advanced composites and principally for aerospace turbine engines.

As shown in FIG. 13, an acoustic attenuation panel 37 for installation in an aero-engine nacelle comprises a backing sheet 38, a cellular core 39 and a facing sheet 40. The cellular core 39 comprises a multiplicity of open-ended juxtaposed cells of hexagonal cross section to provide a honeycomb configuration. Alternatively, cellular cores having juxtaposed cells of other cross-sections may of course be used. The backing sheet 38 is unperforated and made from an impermeable sheet material and is secured by an epoxy resin adhesive to the lower face of the cellular core 39. The facing sheet 40 is a perforate composite sheet as manufactured by the method according to the present invention and is secured by an epoxy resin adhesive to the upper face of the core 39.

The facing sheet 40 perforate open areas would typically range between 5% and 20% of the facing sheet area and would be specified to suit individual engine requirements.

The perforate composite sheet as produced according to the invention may be used as a septum layer in a panel as described with reference to FIG. 12. Septum layers are typically thinner than facing sheets and consequently a composite sheet with a single ply fabric is for example adequate. In this case, the passage forming yarns (which will eventually form the perforations) are inserted into the reinforcing fabric assembly as selected yarns in the warp and/or the weft directions as hereinbefore described with reference to FIGS. 1 and 2. There are a wide range of weaves from which to choose: plain weave as illustrated in FIGS. 1 and 2; 8 harness satin; 5 harness satin as illustrated in FIG. 3; 2×2 twill, "herring bone", crows foot and the like. Typically "light weight" yarns would be used eg 1K, 3K (one thousand; three thousand 7 micro-inch diameter filaments of carbon fibre per warp or weft end).

The perforate composite sheets produced by the method according to the invention may of course also be used to support or reinforce either a stainless steel mesh or a micro-porous thermoplastic facing sheet of a "linear" acoustic liner. In this case, the open area of the perforations can range between 20%–60% of the area of the facing sheet depending on individual engine requirements and the acoustic properties of the rest of the facing sheet. The surface abrasion procedure again doubles as preparation (of both surfaces) for subsequent bonding to the stainless steel mesh or the micro-porous thermoplastic sheet.

When producing "linear" liner reinforcing perforate sheets any method of inserting the passage forming yarns is applicable eg stitch, warp knit, and "2D" and "3D" weaves. However, in this instance, the "2D" single ply weave method is preferred.

As to linear liner facing sheets, a "2D" weave perforating technique is preferred because (1) the mesh or microporous plastic sheet will contribute structurally to the facing sheet of the linear, and (2) completely smooth surfaces are not essential. A "heavy" single ply fabric embodied in a matrix as described with reference to FIGS. 1 and 2 would be adequate reinforcement in this case. As a consequence, a single ply "2D" weave technique, as previously described, will be sufficient. The passage forming yarns are inserted as warp and/or weft yarns in a classical "2D" weave. Again there is a wide range of weave styles to choose from. However, the warp and weft yarns will probably be heavier than those for a septum layer, typically 6K and 40K which will form a thick fabric which is later embodied in a resin matrix and cured.

In the composite sheets described with reference to FIGS. 1 to 3 a single ply woven fabric has been employed as the reinforcing assembly. It will however be appreciated that the single ply assembly may be formed by braiding two or more reinforcing yarn systems to form a single ply fabric sheet. Furthermore, while three dimensional weaving of multi-ply fabrics has been proposed for the reinforcing assembly it will be appreciated that the assembly can be produced by three dimensional braiding.

It will also be appreciated that the passage forming yarns in the yarn assemblies proposed, particularly the three dimensional assemblies can be advantageously directed through the assembly at an angle to the faces of the assembly so that the passages formed in the final composite sheet are inclined to the surface of the sheet. This may be found to be of particular advantage for certain acoustic panels and depending upon the angle direction and airflow direction can lead to substantial acoustic attenuation advantages.

The yarns sub-assemblies 171 to 174 of the reinforcing assemblies 17 schematically illustrated in FIGS. 4 to 7 and 9 of the drawings may take any one of a variety of different forms depending upon the use which is to be made of the composite sheet produced by the method according to the invention. The assembly 17 illustrated in these figures can take the form of the sub-assemblies 24 to 27 of the assembly 17 in FIG. 8 and the stitching yarns 16 employed simply for holding together the four sub-assemblies prior to impregnation of the complete assembly by the matrix material. The stitching yarns 16 may then all be passage forming yarns which are removed by one of the aforementioned methods to provide the perforate composite sheet.

Alternatively the stitching yarns may serve the function of reinforcing the assembly in the thickness direction of the assembly with only some of the stitching yarns 16 serving as passage forming yarns which are removed to create the perforate composite sheet.

Alternatively, and as provided in the reinforcing assembly illustrated in FIG. 11, the four sub-assemblies 32 to 35 are woven together by interlock weaving of warp yarns 36 some of which are passage forming yarns subsequently removed by the method according to the invention to produce the perforate composite sheet. Clearly the warp yarns 36 serve as reinforcing yarns providing reinforcement in the thickness direction of the reinforcing assembly.

The stitching yarn is preferably a continuous monofilament, although an assembly of continuous filaments in the form of a tow or twisted or a yarn spun from short fibres may be employed in appropriate circumstances.

Dissolvable yarns are known which are used to secure textile fabric assemblies prior to submergence in a liquid which dissolves and removes them from the fabric. They are in the form of ultra fine filaments which are ideal for that purpose as the liquid gains access to their full circumference and dissolves their low bulk much more quickly and efficiently than heavier filaments would.

"Low melt point" yarns are also more efficient in ultra fine multi filament form either because fine filaments improve their mechanical performance (as with any high performance yarn) and their low bulk ensures efficient and quick break down within the fabric, on the application of heat.

Multi-layers of carbon fabric have been stitched together successfully using the above multi-filament yarns. These fabrics have also been resin transfer moulded without encountering any significant problem. They are, however, not regarded as suitable in post cure removal because of the ultra fine filament form of these yarns.

Although multi filament yarns may be used in the method according to the invention, their removal is expected to be difficult for the following reasons:

(1) In a laminate, the matrix completely surrounds (encapsulates) the fine filaments and after the surfaces of the laminate have been abraded only the micro "ends" of the filaments are exposed to the liquid for the dissolving process. Since this area is minute, dissolving of the filaments is very slow, even if there is a large number of ends. Also the surrounding matrix maintains the laminate integrity, preventing the required hole size/porosity being achieved/produced.

(2) The same is also true for "melt out" or "heat degradation". In this case because the diameters and quantity of low melt filaments is so small, removal is also impracticable.

(3) Fine flexible filaments in a multi-filament yarn assume complex paths through the laminate, and consequently removal is difficult to carry out. Also the surface of these yarns need not necessarily be smooth and parallel which also complicates their removal.

Many or all of the problems encountered with ultra fine multi-filament yarns can however be overcome by choosing for post cure removal in the method according to the invention one or more of the following passage forming yarns:

(a) Monofilament (Single Polymer)

The passage forming yarns are monofilaments with a diameter equivalent to the required hole size. As a consequence, the area exposed to the dissolving liquid or available for melt-out discharge will be significantly larger. Also the problem of matrix surrounding multiple fine filaments is eliminated and parallel smooth surfaces are much more achievable. As a consequence the dissolving process is quickened and the extraction path for "melt out" or "softened" filaments is simplified.

(b) Monofilament (Dual Polymer Material)

In this case the monofilament will be as described for (a) above except that it is manufactured from two different discrete materials as follows:

(i) An inner core in, for example, a polymer which is either highly reactive to the dissolving liquid and/or which would be susceptible to chemical change through exposure to the injection matrix material.

(ii) A thin outer coating in a polymer or other material which would isolate the inner core during injection and may be left in place after the core is removed or melted out. Alternatively, the thin outer coating may be in a material which reduce the fiber coefficient of friction to facilitate pull out of the yarn.

(c) Monofilament (Various Cross Sections)

In this case the monofilament of single or dual polymer materials is produced with a cross section other than circular which would either facilitate release, increase the tow cross sectional area or increase the laminates attenuation properties. For example, oval, triangular, rectangular, square or other cross sections may be used.

(d) Monofilament (Hollow)

In this case the monofilament is in the form of a tubular element and may be constructed as follows:

(i) If a dissolvable polymer is chosen for the monofilament the hollow cross section will, after the surface of the laminate/fibers have been abraded, allow the dissolving liquid into the core to facilitate and speed dissolution.

(ii) The hollow monofilament is left in place ie not removed after cure. The inner core diameter is then equivalent to the required hole size. The perforate laminate is created by abrasion of the outer surfaces of the composite sheet. The hollow monofilament must be so chosen as to hold its integrity throughout the manufacturing process ie during incorporation into the preform and during the injection process, otherwise the core will fill with resin. As a consequence this method is more suited to simpler (less involved) fiber insertion techniques such as weaving and braiding and less suitable for the more complex fiber insertion techniques such as stitching, and warp and weft knitting.

Suitable dissoluble polymers for the monofilaments include acrylics (acrylate), polystyrene, cellulose, PVA and the others hereinafter mentioned as well as metals which will dissolve or corrode as part of a galvanic cell. For example aluminium or steel can be considered as a material to be selected.

Dissolvable metallic filaments however require a slightly different technique from that which has already been proposed. In this technique the dissolving action is achieved by choosing an appropriate electrolytic or acidic solution which will accelerate a galvanic or chemical corrosion action, without damaging the laminate.

The raw materials for the hollow monofilaments need not necessarily be a polymeric. Suitable materials for the hollow monofilaments (and the outer coating for the dual polymer material filaments) include:

(a) Polytetrafluorethene (PTFE) or other suitable fluorocarbon polmers (for the release/pull out techniques).

(b) Thermoplastics such as aramid, polyacronitrile, PEEK, PEK, PEKK, PEI, PES, PPS or others (for those which are left in place).

(c) Thermoplastics such as polyproplene, polyvinylchloride, polystyrene polyethelene, polyamide, polyester etc (for those which are to be melted or dissolved away).

(d) Other materials such as glass, quartz, carbon/graphite and metals, for example stainless steel, nickel and zinc.

We claim:

1. A method of manufacturing a multi-ply fabric reinforced perforate composite sheet in which the front face of the composite sheet is presented by one ply of the fabric and the rear face is presented by another ply of the fabric comprising the steps of forming a multi-ply fabric assembly which includes reinforcing filament structures and passage forming filament structures and in which the passage forming filament structures extend from the front face of the assembly to the rear face of the assembly, applying a matrix material to the assembly to form a multi-ply fabric reinforced composite sheet in which the front face of the composite sheet is presented by one ply of the fabric and the rear face is presented by another ply of the fabric and in which the passage forming filament structures extend from the front face of the sheet to the rear face of the sheet and removing the passage forming filament structure or a part or parts thereof thereby to produce a multiplicity of passages extending through the multi-ply fabric reinforced composite sheet from the front face of the sheet to the rear face of the sheet.

2. A method according to claim 1 wherein the passage forming filament structures or a part or parts thereof are made from a selected material so selected as to transform into a dischargeable state when the sheet is subjected to a condition which does not adversely affect the material or materials from which the matrix and the other filament structures are made and wherein the selected material is removed from the composite sheet by subjecting the composite sheet to the predetermined condition to cause the selected material to transform into the dischargeable state and by discharging the selected material in the dischargeable state from the sheet to produce the multiplicity of passages.

3. A method according to claim 2 wherein the passage forming filament structures are formed throughout from the selected material, whereby discharge of the dischargeable selected material in the dischargeable state results in complete removal or substantially complete removal of the passage forming filament structures to produce the multiplicity of passages.

4. A method according to claim 2 wherein the passage forming filament structures are formed from the selected material in a part or parts only thereof and wherein the disposition of the part or parts are such that the discharge of the selected material in the dischargeable state produce the multiplicity of passages through the composite sheet.

5. A method according to claim 4 wherein the passage forming filament structures are in the form of a yarn which has a core and an outer wall which surrounds the core wherein the part of the passage forming filament structures is the core which is made from the selected material and wherein the wall is made from a material which does not transform into a dischargeable state under the condition, whereby discharge of the selected material in the dischargeable state results in removal of the core of the yarn to produce the multiplicity of passages.

6. A method according to claim 2 wherein the selected material has a melt temperature below that of the matrix material and that of the material or materials from which the other filament structures are made and wherein the selected material is removed from the composite sheet by heating the composite sheet to the melt temperature to cause the selected material to melt and by discharging the selected material in the molten state from the sheet.

7. A method according to claim 6 wherein the matrix material is a synthetic resin, wherein the fabric assembly and the matrix material are precured at a temperature below the melt temperature to form the composite sheet, wherein the composite sheet is then subjected to a post curing step in which the composite sheet is heated to a temperature above the melt temperature to cause the selected material to melt and wherein the selected material in the molten state is discharged from the sheet.

8. A method according to claim 7 wherein the selected material is discharged in the molten state from the composite sheet by subjecting the sheet to a pneumatic pressure differential which serves to blow or suck out the selected material in the molten state from the sheet.

9. A method according to claim 2 wherein the selected material is soluble in a solvent with respect to which the matrix material and the material or materials from which the other filament structures are made are insoluble and wherein the selected material is removed from the composite sheet by applying the solvent to the composite sheet to cause the selected material to dissolve in the solvent and discharging the selected material dissolved in the solvent from the sheet.

10. A method according to claim 1 including the step of abrading the front and rear faces of the composite sheet to remove any surface coating of matrix material and to remove or expose the passage forming filament structures extending outwardly from the faces.

11. A method according to claim 1 wherein the passage forming filament structures are tubular structures with peripheral walls which forms axial bores through the tubular structure and wherein those parts of the tubular structures which extend outwardly from the front face and from the rear face of the composite sheet are removed to provide a multiplicity of tubular elements which extend within the composite sheet from the front face to the rear face and which have axially extending bores which are open at the front face and the rear face of the sheet to produce the multiplicity of passages.

12. A method according to claim 11 including the step of abrading the front and rear faces of the composite sheet to remove those parts of the tubular structures lying outside the front and rear faces of the composite sheet.

13. A method according to claim 1 wherein the passage forming filament structures are made from a selected material so selected as to have a tensile strength and wherein the passage forming filament structures are removed from the composite sheet by mechanically withdrawing them to produce the multiplicity of passages.

14. A method of manufacturing a yarn reinforced perforate composite sheet comprising the steps of forming a yarn assembly which includes reinforcing yarn structures and passage forming monofilament yarn structures and in which the passage forming monofilament yarn structures extend from the front face of the assembly to the rear face of the assembly, applying a matrix material to the assembly to form a composite sheet in which the passage forming monofilament yarn structures extend from the front face of the sheet to the rear face of the sheet and removing the passage forming monofilament yarn structures or a part or parts thereof thereby to produce a multiplicity of passages which extend through the composite sheet from the front face of the sheet to the rear face of the sheet.

15. A method according to claim 14 wherein the yarn assembly is formed by braiding two or more reinforcing sub-assemblies of yarn to form a single ply fabric sheet and wherein the passage forming monofilament yarn structures are monofilament yarns in one or each of the yarn sub-assemblies.

16. A method according to claim 1 wherein the fabric assembly includes a reinforcing assembly of reinforcing filament structures, and an auxiliary assembly of auxiliary filament structures which extend from a first face of the fabric assembly to an opposite second face of the fabric assembly by passage through the reinforcing assembly and wherein the passage forming filament structures are auxiliary passage forming filaments structures in the auxiliary assembly.

17. A method according to claim 16 wherein the passage forming auxiliary filament structures are loop forming yarns which pass along the first face of the reinforcing assembly and are formed at intervals therealong with loops which penetrate the reinforcing assembly and which extend from the first face of the reinforcing assembly to the opposite second face of the reinforcing assembly.

18. A method according to claim 17 wherein each loop of each loop forming yarn is produced in a stitching process in which a stitching needle penetrates the reinforcing assembly and upon withdrawal leaves the filament loop in a passage in the reinforcing assembly produced by the needle.

19. A method according to claim 18 wherein the auxiliary assembly includes for each loop forming yarn a loop retention yarn which runs along the second face of the reinforcing assembly and passes through and retains the ends of the loops of the loop forming yarn.

20. A method according to claim 19 wherein the loop forming yarns and the loop retention yarns are removed from the composite sheet in the formation of the perforate composite sheet.

21. A method according to claim 19 wherein the loop retention yarns remain in place in the composite sheet after removal of the loop forming yarns.

22. A method according to claim 17 wherein a release film is applied to the first face of the reinforcing assembly prior to the application of the loop forming yarns to assist in the subsequent removal of the loop forming yarns.

23. A method according to claim 17 wherein the loop forming yarns are applied to the reinforcing assembly by chain stitching.

24. A method according to claim 1 wherein the fabric assembly is formed by interlacing three or more reinforcing assemblies of yarns to form a multi-ply fabric reinforcing sheet and wherein the passage forming filament structures are yarns of one or more of the reinforcing yarn assemblies which traverse the fabric sheet from a first face thereof to an opposite second face thereof.

25. A method according to claim 24 wherein the multi-ply fabric sheet is produced by three dimensional angle interlock weaving of the yarns of the reinforcing yarn assembly.

26. A method according to claim 24 wherein the multi-ply fabric sheet is produced by orthogonal weaving of the yarns of the reinforcing yarn assembly.

27. A method according to claim 24 wherein the multi-ply fabric sheet is produced by three dimensional knitting of the yarns of the reinforcing yarn assembly.

28. A method according to claim 24 wherein the multi-ply fabric sheet is produced as a multiaxial warp knit fabric reinforcing sheet formed from superposed warp, weft and bias filament systems held together by an assembly of stitching yarns and wherein the passage forming filaments are stitching yarns in the stitching yarn assembly.

29. A method according to claim 28 wherein the stitching yarn assembly is applied to the reinforcing yarn assembly in the form of a chain or tricot stitch.

30. A method according to claim 1 wherein the matrix material is a synthetic resin.

31. A method according to claim 1 wherein the reinforcing filament structures are carbon or graphite continuous filament fibers.

32. A reinforced perforate composite sheet manufactured by a method according to claim 1.

33. A method according to claim 14 wherein the yarn assembly is formed by weaving two or more reinforcing sub-assemblies of yarn to form a single ply fabric sheet and wherein the passage forming monofilament yarn structures are monofilament yarns in one or each of the yarn sub-assemblies.

34. A reinforced perforate composite sheet manufactured by a method according to claim 14.

* * * * *

UNITED STATES PATENT AND TRADEMARK OFFICE
CERTIFICATE OF CORRECTION

PATENT NO. : 5,490,602

DATED : February 13, 1996

INVENTOR(S) : Robert S. Wilson and Mark A. Braniff

It is certified that error appears in the above-identified patent and that said Letters Patent is hereby corrected as shown below:

Col. 2, line 54, "resins," should be --resin--.

Col. 2, line 62, insert --be-- after "then".

Col. 16, line 21, "produce" should be --produces--.

Col. 18, line 54, "weaving" should be --braiding--.

Signed and Sealed this

Twenty-fourth Day of June, 1997

Attest:

BRUCE LEHMAN

Attesting Officer

Commissioner of Patents and Trademarks